Patented Apr. 13, 1926.

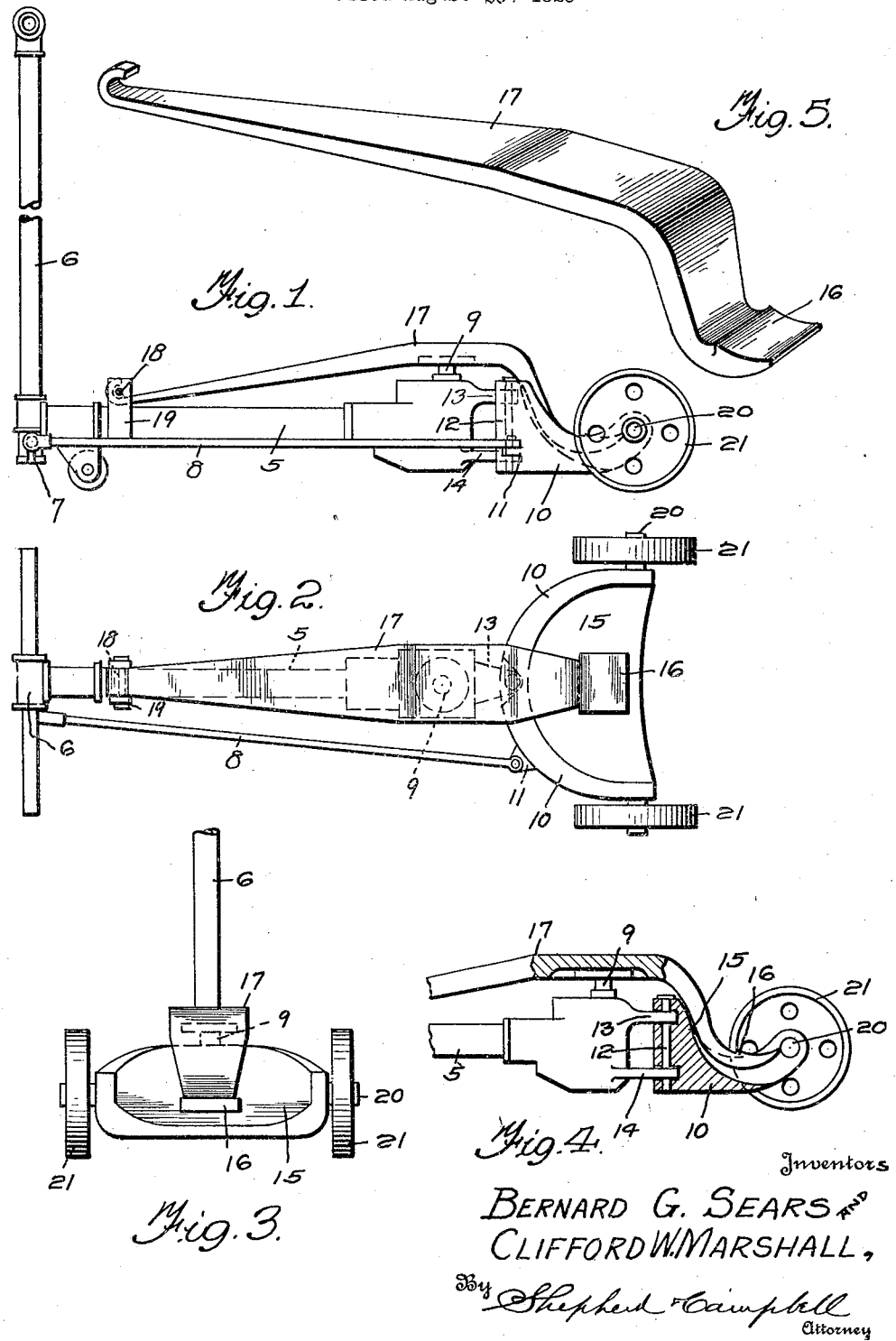

1,580,862

UNITED STATES PATENT OFFICE.

BERNARD G. SEARS AND CLIFFORD W. MARSHALL, OF GUERNEVILLE, CALIFORNIA.

ATTACHMENT FOR AUTOMOBILE JACKS.

Application filed August 25, 1925. Serial No. 52,352.

*To all whom it may concern:*

Be it known that BERNARD G. SEARS and CLIFFORD W. MARSHALL, citizens of the United States, residing at Guerneville, in the county of Sonoma and State of California, have invented certain new and useful Improvements in Attachments for Automobile Jacks, of which the following is a specification.

This invention relates to attachments for automobile jacks of the wheeled type, such as are commonly employed in garages, for lifting the entire end of an automobile clear of the ground.

With the advent of the balloon tire, new problems have presented themselves in connection with the use of devices of this character, due to the fact that the wheels proper of the automobiles are much smaller in diameter than formerly, so that the axle and differential housing of the automobiles lie much closer to the floor than formerly, with the result that the lifting jacks of known type will not pass beneath those portions of the automobiles commonly engaged. This is especially true when a tire is deflated.

It is, therefore, a primary object of the present invention to provide, in conjunction with a wheeled lifting jack of known form, an auxiliary arm, the engaging end of which will lie at a much lower level than the lifting element of the jack proper, but which arm will be engaged and lifted by the lifting element of the jack. This renders it possible to utilize the existing jack for the lifting of automobiles equipped with balloon tires or otherwise very "low hung."

Further objects and advantages of the invention will be set forth in the detailed description which follows.

In the accompanying drawing:

Fig. 1 is a side elevation of a conventional type of wheeled lifting jack, having the improvement of the present invention applied thereto.

Fig. 2 is a plan view of the structure, illustrated in Fig. 1.

Fig. 3 is a fragmentary rear end elevation.

Fig. 4 is a view partly in vertical section and partly in side elevation and

Fig. 5 is a perspective view of the auxiliary foot or arm, hereinafter described.

Like numerals designate corresponding parts in all of the figures of the drawing.

Known types of wheeled automobile jacks, already on the market, comprise a longitudinally extending housing 5, an operating handle 6, a steering knuckle 7, a steering link 8 and a vertically movable lifting head 9. The parts, so far described, are of conventional construction and constitute no part of the present invention except as they may cooperate with the elements hereinafter described. In the known type of jacks, hereinbefore referred to, the steering link 8 imparts turning steering movement to an element comprising a transversely extending rear axle which extends all the way between the rear wheels. In carrying out the invention, we dispense with the element referred to and substitute the block indicated at 10, which is provided with an ear 11, for connection with the rear end of the steering link 8. This block 10 is pivotally connected to the rear end of the housing 5 by means of pivot bolt 12, said bolt passing through ears 13 and 14. The block 10 is cut out as indicated at 15, to provide a depressed portion in which the foot 16 and an arm 17, rests. The forward end of this arm is pivotally connected to a pin 18 that is carried by a U-shaped stirrup 19, which is attached to the body 5. The foot 16 constitutes the lifting element and it lies at such a low point that it may be engaged beneath the differential housing of an automobile equipped with balloon tires, even when said tires are deflated. An intermediate portion of the arm 17 overlies and rests upon the lifting head 9 of the jack proper. Thus when this lifting head rises, it lifts the foot 16 and any object by which said foot is engaged, the arm as a whole swinging from the fulcrum constituted by the pin 18.

The block 10 carries stub shafts 20, said stub shafts in turn carrying supporting wheels 21. This structure spaces the axles of the supporting wheels from each other in such manner as to permit the entry of the differential housing freely between the wheels so that it may be engaged by the foot 16.

From the foregoing description, it will be seen that simple and efficient means have been provided whereby a known type of jack may be caused to lift objects, materially lower than the usual lifting head 9.

It is to be understood that the invention is not limited to the precise construction set forth, but that it includes within its purview whatever changes fairly come within either the terms or the spirit of the appended claims.

Having described my invention, what I claim is:

1. The combination with a lifting jack comprising a lifting head, of an arm, means for pivotally connecting the forward end of said arm to a forward portion of the jack, said arm overlying and resting upon said lifting head at an intermediate portion in its length, and a depressed rear end upon said arm.

2. The combination with a jack comprising a longitudinally and horizontally extending body portion of a block pivoted for horizontal swinging movement to the rear end of said jack, said block comprising a depressed central portion and having stub shafts at the opposite sides thereof, supporting wheels upon said stub shafts and an auxiliary arm extending lengthwise of the jack and pivoted at its forward end to the body portion of the jack and having a depressed rear end which lies between said supporting wheels, an intermediate portion of said arm resting upon the usual lifting head of the jack.

In testimony whereof we affix our signatures.

BERNARD G. SEARS.
C. W. MARSHALL.